United States Patent
Yuan et al.

(10) Patent No.: US 10,069,893 B2
(45) Date of Patent: Sep. 4, 2018

(54) METHOD AND SYSTEM FOR PROVIDING INTERNET APPLICATION SERVICES

(71) Applicant: Alibaba Group Holding Limited, George Town (KY)

(72) Inventors: Zhijun Yuan, Hangzhou (CN); Xiaodan Dai, Hangzhou (CN); Yang Yang, Beijing (CN)

(73) Assignee: Alibaba Group Holding Limited (KY)

( * ) Notice: Subject to any disclaimer, the term of this patent is extended or adjusted under 35 U.S.C. 154(b) by 29 days.

(21) Appl. No.: 14/669,868

(22) Filed: Mar. 26, 2015

(65) Prior Publication Data

US 2015/0281320 A1 Oct. 1, 2015

(30) Foreign Application Priority Data

Mar. 31, 2014 (CN) .......................... 2014 1 0127705

(51) Int. Cl.
  *G06F 15/16* (2006.01)
  *H04L 29/08* (2006.01)
  *G06Q 30/02* (2012.01)

(52) U.S. Cl.
  CPC ......... *H04L 67/02* (2013.01); *G06Q 30/0241* (2013.01); *H04L 67/20* (2013.01)

(58) Field of Classification Search
  CPC ...... H04L 67/02; H04L 67/20; G06Q 30/0241
  USPC ................................. 709/203, 217, 228, 230
  See application file for complete search history.

(56) References Cited

U.S. PATENT DOCUMENTS

| | | | |
|---|---|---|---|
| 6,014,624 A * | 1/2000 | Raman | G10L 15/08 704/243 |
| 7,653,729 B2 | 1/2010 | Mihira | |
| 8,301,550 B2 | 10/2012 | Pappas et al. | |
| 9,817,994 B2 * | 11/2017 | Jain | G06F 21/6227 |
| 2002/0082879 A1 | 6/2002 | Miller et al. | |
| 2002/0143681 A1 | 10/2002 | Yen et al. | |
| 2005/0021387 A1 | 1/2005 | Gottfurcht et al. | |
| 2006/0015353 A1* | 1/2006 | Reese | H04L 49/253 709/217 |
| 2009/0192928 A1* | 7/2009 | Abifaker | G06Q 30/02 705/35 |
| 2010/0241664 A1 | 9/2010 | Levasseur et al. | |
| 2012/0078731 A1 | 3/2012 | Linevsky et al. | |

(Continued)

FOREIGN PATENT DOCUMENTS

JP 2011013994 1/2011
JP 2011175461 9/2011

(Continued)

*Primary Examiner* — Michael Y Won
(74) *Attorney, Agent, or Firm* — Van Pelt, Yi & James LLP

(57) ABSTRACT

Providing Internet application services includes acquiring an invocation command for an Internet application service and opening a service page corresponding to the Internet application service, generating an Internet application service invocation result based on an Internet application service invocation operation performed by a user on the service page, sending the Internet application service invocation result to the Internet application service provider and causing the Internet application service provider to generate invocation result card model data based on the Internet application service invocation result, generating an invocation result display card, and displaying the one or more other Internet application services to the user.

12 Claims, 17 Drawing Sheets

(56) References Cited

U.S. PATENT DOCUMENTS

| | | | | |
|---|---|---|---|---|
| 2013/0086594 A1* | 4/2013 | Cottrell | ................... | H04L 67/16 |
| | | | | 719/313 |
| 2013/0226998 A1* | 8/2013 | Heo | ...................... | H04L 67/303 |
| | | | | 709/203 |
| 2013/0246905 A1 | 9/2013 | Isozaki | | |
| 2015/0120900 A1* | 4/2015 | Sahoo | ................. | G06F 21/6227 |
| | | | | 709/223 |
| 2015/0127628 A1* | 5/2015 | Rathod | ................... | H04W 4/21 |
| | | | | 707/710 |

FOREIGN PATENT DOCUMENTS

| | | |
|---|---|---|
| JP | 2012133567 | 7/2012 |
| JP | 2013200846 | 10/2013 |

\* cited by examiner

```
{
 "cardId" : 123,
 "userId" : 123,
 "vendor" : "trip.lifecard.yunos.com",
 "type" : "trip",
 "title" : "CA9999_PEK_HGH_2014-01-16 15:30",
 " logourl" : "http://img01.taobaocdn.com/tps/i1/T17MeuXnlsXXXXXXXX-50-50.png",
 "location" : "Hangzhou",
 " occurtime" : "2014-01-12",
 " barcode" : {
  "message" : "SFOJFK JOHN APPLESEED LH451 2012-07-22T14:25-08:00",
  "format" : "PKBarcodeFormatPDF417"
 },
   "trip" : { "airLineName" : "Air China Limited",
    "arrAirport" : "HGH",
    "arrCityName" : "Hangzhou",
    "arrDate" : "2014-01-16 16:30:00.0",
    "depAirport" : "PEK",
    "depCityName" : "Beijing",
    "depDate" : "2014-01-16 15:30",
    "depTime" : "2014-01-16 15:30:00.0",
    "flightNO" : "CA9999"
   }
 }
```

You may also need:
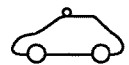 FastTaxi: Getting a taxi to the theater (5.6 kilometers distance)
 Taodiandian: Takeout food delivery
 Mailesong: Fast food delivery (15 set meals available)
FIG. 11

METHOD AND SYSTEM FOR PROVIDING INTERNET APPLICATION SERVICES

CROSS REFERENCE TO OTHER APPLICATIONS

This application claims priority to People's Republic of China Patent Application No. 201410127705.X entitled A METHOD, A SYSTEM, A USER DEVICE, AND A SERVER FOR PROVIDING INTERNET APPLICATION SERVICES, filed Mar. 31, 2014 which is incorporated herein by reference for all purposes.

FIELD OF THE INVENTION

The present application relates to a method and a system for providing Internet application services.

BACKGROUND OF THE INVENTION

As computer communications technology develops, functions are added to mobile phones and other such user devices. Installing various application programs on user devices and implementing various Internet applications through the various Internet application services provided by the various Internet application programs have become possible. For example, a shopping application program is installed for shopping; a weather application program is installed for looking up weather information; an aviation application program is installed for purchasing airline tickets, etc.

However, currently, to use Internet application services, the user is to install a corresponding application program and open the corresponding application program before being able to implement the corresponding Internet application. When the user is to use several Internet applications, e.g., purchasing movie tickets to see movies, finding a restaurant to eat a meal near the movie theater, and riding a taxi back home, the user is to install multiple application programs that can provide the above Internet applications. In addition, switching back and forth between various application programs occupies storage space on the user device and utilizes a significant amount of user time.

BRIEF DESCRIPTION OF THE DRAWINGS

Various embodiments of the invention are disclosed in the following detailed description and the accompanying drawings.

FIG. 6 is a diagram of an example of result card model data.

FIG. 11 is a diagram of an example of additional services associated with an invocation result card.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
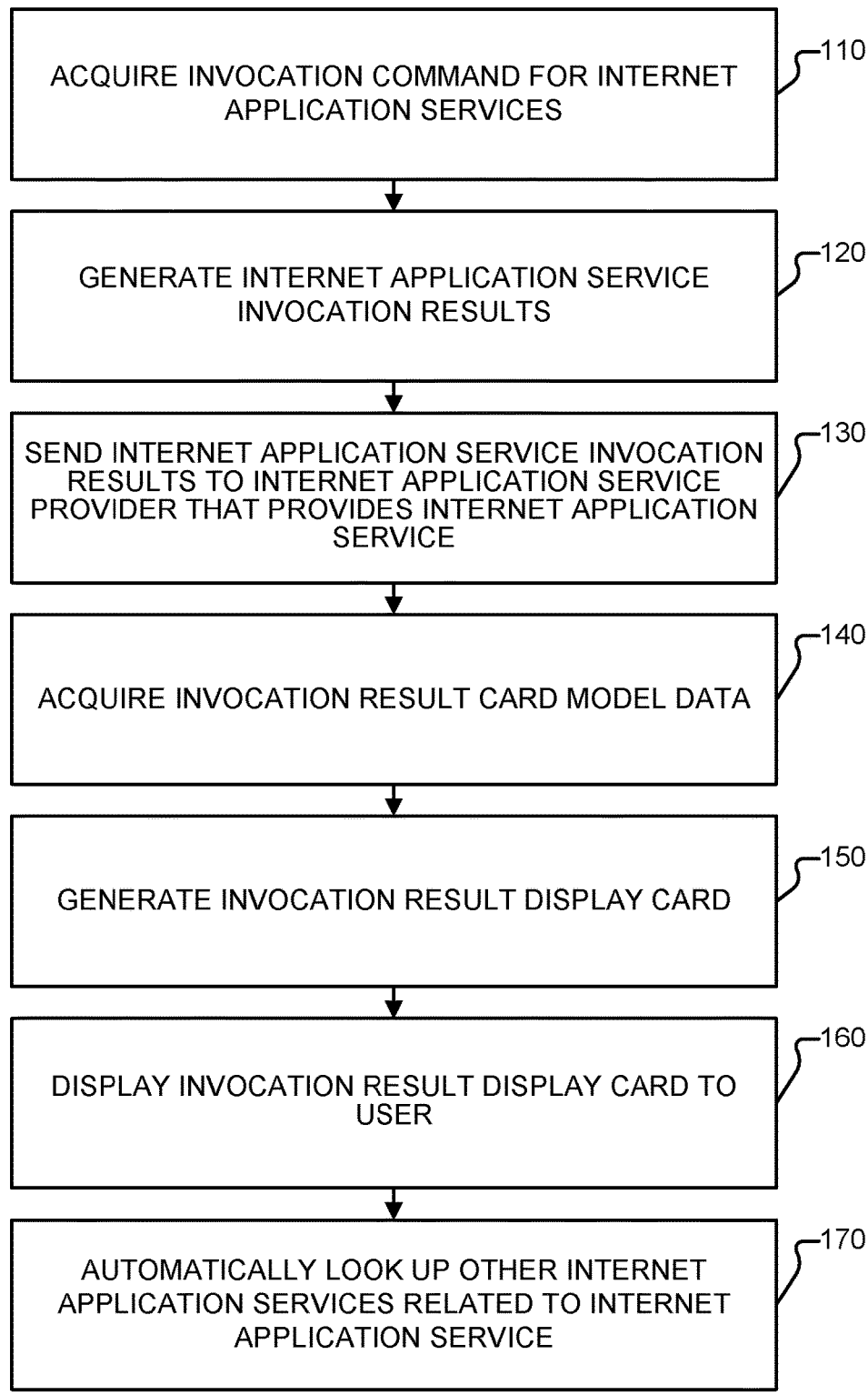
FIG. 1A is a flowchart of an embodiment of a process for providing Internet application services.

FIG. 1A is a flowchart of an embodiment of a process for providing Internet application services. In some embodiments, the method is implemented by a user device 3300 of FIG. 3 and comprises:

In 110, the user device acquires an invocation command for Internet application services and opens service pages corresponding to the Internet application services. Examples of invocation commands include clicking on a button, touching a location on a touch screen, and the like. As used herein, a service page refers to a webpage that is provided by an Internet application service.

Figure 1B:
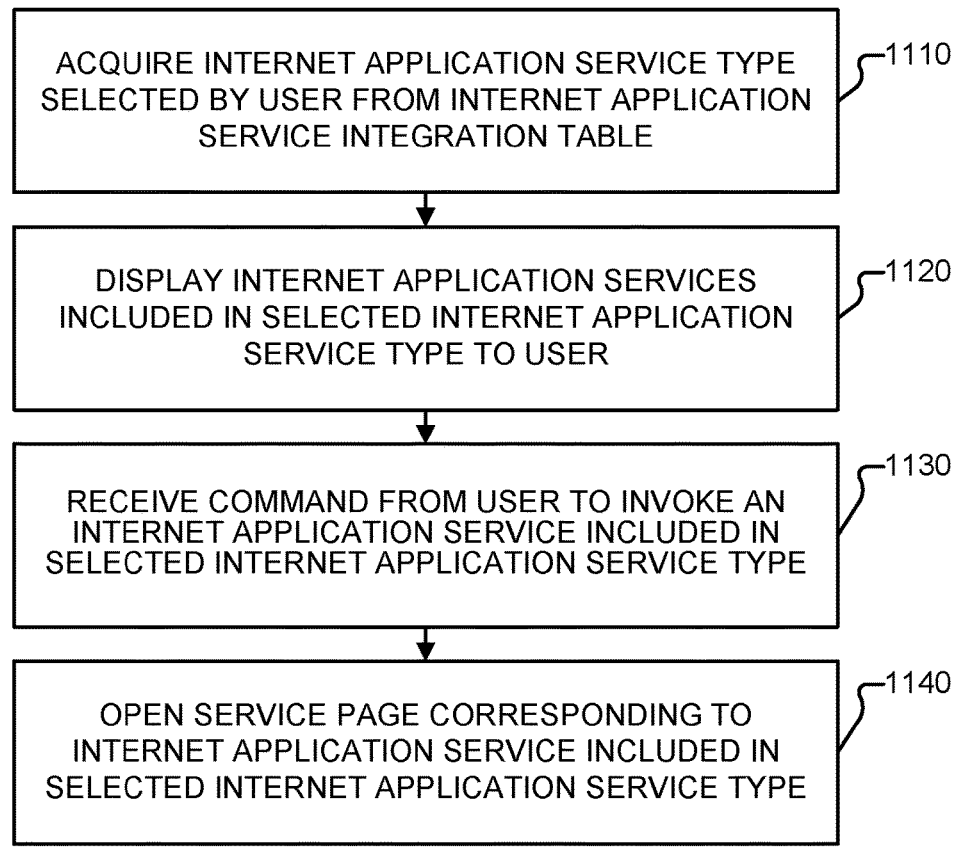
FIG. 1B is a flowchart of an embodiment of a process for acquiring an invocation command for Internet application services and opening service pages corresponding to the Internet application services.

FIG. 1B is a flowchart of an embodiment of a process for acquiring an invocation command for Internet application services and opening service pages corresponding to the Internet application services. In some embodiments, the process 1100 is an implementation of operation 110 of FIG. 1A and comprises:

In 1110, the user device acquires an Internet application service type selected by a user from an Internet application service integration table. In some embodiments, the Internet application service integration table includes various types of Internet application services, and each type of Internet application service includes at least one Internet application service.

In 1120, the user device displays Internet application services included in the selected Internet application service type to the user.

In 1130, the user device receives the invocation command from the user to invoke an Internet application service included in the selected Internet application service type.

In 1140, the user device opens a service page corresponding to the Internet application service included in the selected Internet application service type based on an entry address corresponding to the Internet application service included in the selected Internet application service type.

In some embodiments, the above Internet application service integration table is established and generated in advance by a card server. In some embodiments, the card server is a type of server used to complete at least a portion of logic for a card. In some embodiments, the card server acquires registration information of the Internet application service provider. In some embodiments, the registration information includes an identification number for the Internet application service provider, a service type of the Internet application service provided by the Internet application service provider, an entry address of the Internet application service provided by the Internet application service provider, a certificate key of the Internet application service provider (e.g., a certificate issued by a certificate authority), and the like. The certificate key is used to verify the Internet application service provider's authority and ID. In some embodiments, the card server stores the registration information of the Internet application service provider in the corresponding Internet application service type in the Internet application service integration table based on the service type of the Internet application service provided by the Internet application service provider. In some embodiments, the Internet application service integration table includes various types of Internet application services, and each type of Internet application service includes at least one Internet application service.

As an example, after the card server generates an Internet application service integration table, the card server pushes the Internet application service integration table to a local client (e.g., a user device). Examples of user devices include a phone, a tablet, a watch, and the like. Moreover, in the event that the Internet application service integration table subsequently changes (e.g., when a new Internet application service provider is registered or an Internet application service provided by an Internet application service provider changes), the card server pushes the change information to the local client to be synchronously updated locally.

As another example, in the event that the Internet application service provider is to provide Internet application services based on the process 100 of FIG. 1A, then registration information can be submitted in advance to the card server for registration. Multiple Internet application service types such as aviation, chatting, taxi, entertainment, and traffic exist. Each type of Internet application service includes at least one Internet application service that can provide a related service type. For example, the Internet application service type of aviation includes Air China, China Southern Airlines, and China Eastern Airlines. In another example, the Internet application service type of chatting includes QQ and Fetion.

Referring back to FIG. 1A, in 120, the user device generates Internet application service invocation results based on an Internet application service invocation operation performed by the user on an opened service page.

As an example, a user performs a corresponding Internet application service invocation operation on an opened service page based on the actual application need. For example, the user performs an operation of purchasing an airline ticket on an Air China service page. Internet application service invocation results are generated based on an Internet application service invocation operation performed by the user on the Air China service page. For example, ticket information is generated based on purchasing an airline ticket on the Air China service page.

In 130, the user device sends the Internet application service invocation results to the Internet application service provider that provides the Internet application service and generates invocation result card model data based on the Internet application service invocation results.

For example, the card server sets up a card data model in advance to facilitate identification of the relevant data by each Internet application service provider. The Internet application service provider, based on the Internet application service invocation results, generates invocation result card model data based on the card data model.

As used herein, a card refers to a set of code that is generated according to a card data model and displayed graphically on the user device. A card data model specifies, among other things, various fields of the card and the appearances of certain fields, and also includes the data of the card. The card itself corresponds to a view. As an example, the card data model is as shown in Table 1 below:

TABLE 1

| Fixed Fields | Variable Fields | Appearance |
| --- | --- | --- |
| Cloud phone user ID (ID number) | Weak key-value Specific business field custom-made according to card type | backgroundColor (background color) foregroundColor (foreground color) labelColor (label color) |
| Card ID | | |
| Internet application service provider ID | | |
| Card type | | |
| Small card title | | |
| Small card auxiliary information | | |
| Time | | |
| Geographic information | | |
| QR code/barcode | | |

The card type in Table 1 corresponds to a service type of corresponding Internet application services.

In 140, the user device acquires invocation result card model data.

Figure 1C:
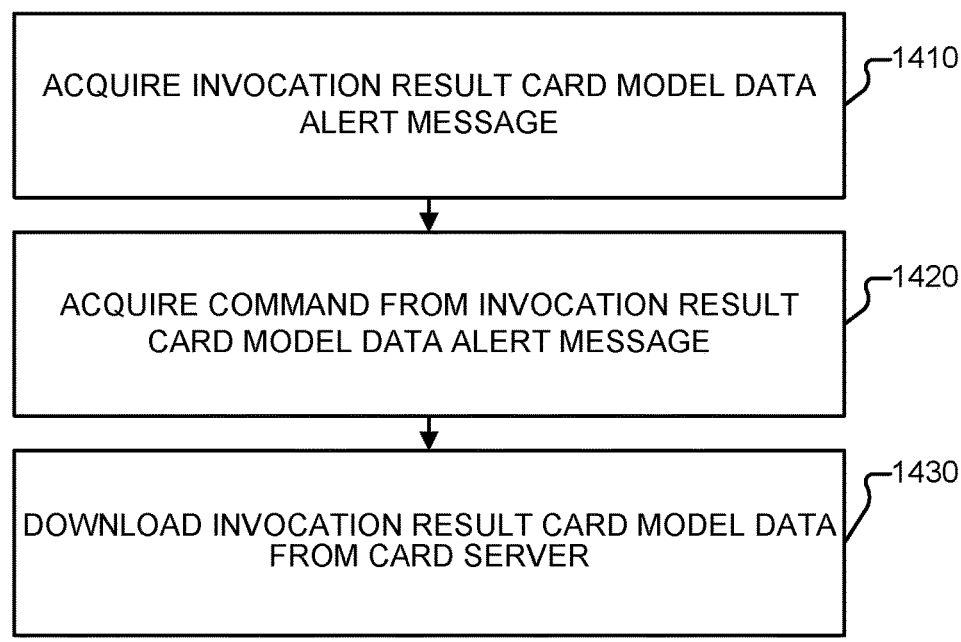
FIG. 1C is a flowchart of an embodiment of a process for acquiring invocation result card model data.

FIG. 1C is a flowchart of an embodiment of a process for acquiring invocation result card model data. In some embodiments, the process 1400 is an implementation of operation 140 and comprises:

In 1410, the user device acquires an invocation result card model data alert message sent by a card server. In some embodiments, the invocation result card model data alert message is generated by the card server after the card server receives the invocation result card model data sent from the Internet application service provider, and the invocation result card model data is stored at the card server after the card server receives the invocation result card model data from the Internet application service provider. The alert message can be a message formatted based on a protocol such as HTTP, and includes text indicating to the user that an update or other activity has occurred and the user's attention is needed.

In 1420, the user device acquires the command when the user opens the invocation result card model data alert message.

In 1430, the user device downloads invocation result card model data from the card server.

The downloading of the card model data can be invoked by a client command or a card server push.

For example, after the Internet application service provider generates the invocation result card model data based on the Internet application service invocation results and sends the invocation result card model data to the card server, the card server directly pushes the invocation result card model data to the local client. In order to enhance the experience, the card server can also generate an invocation result card model data alert message and send the invocation result card model data alert message to the local client. After the invocation result card model data alert message is opened locally, the invocation result card model data is downloaded from the card server. In the event that the local party does not wish to receive the invocation result card model data, the user can choose to avoid opening the invocation result card model data alert message.

Referring back to FIG. 1A, in 150, the user device generates an invocation result display card based on the invocation result card model data and an invocation result card template corresponding to the Internet application service invocation results.

Figure 1D:
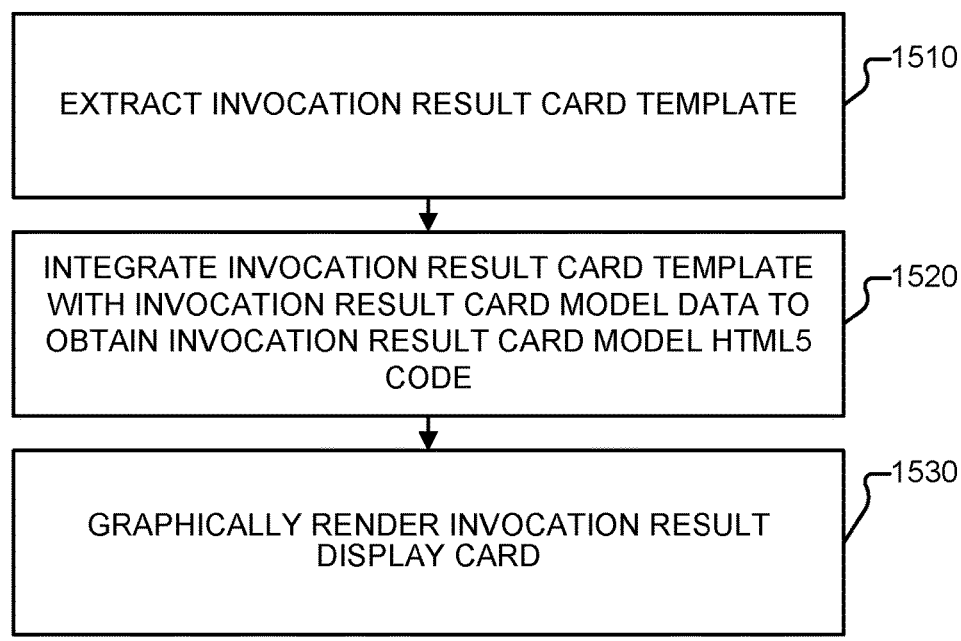
FIG. 1D is a flowchart of an embodiment of a process for generating an invocation result display card.

FIG. 1D is a flowchart of an embodiment of a process for generating an invocation result display card. In some embodiments, the process 1500 is an implementation of operation 150 and comprises:

In 1510, the user client extracts the invocation result card template corresponding to the Internet application service invocation results.

In 1520, the user client integrates the invocation result card template with the invocation result card model data to obtain an invocation result card model HyperText Markup Language (HTML) 5 code.

In 1530, the user client graphically renders the invocation result display card based on the invocation result card model HTML5 code.

Referring back to FIG. 1A, in 160, the user client displays the invocation result display card to the user.

In 170, while performing operation 160, the user client automatically looks up other Internet application services related to the Internet application service, and displays the other Internet application services to the user.

At the same time, the automatically looking up of the other Internet application services related to the Internet application service includes automatically looking up preset Internet application service relationships to obtain the other Internet application services related to the Internet application service.

As an example, the card server, based on the service types of the Internet application services included in the Internet application service integration table, sets up relationships between all the various Internet application services included in the Internet application service integration table to obtain Internet application service relationships and then pushes the Internet application service relationships to the local client.

The process 100 for providing Internet application services comprises: automatically stringing multiple inter-related Internet application services together based on a card as a vehicle therefor. Without being required to open multiple application programs, a user can make integrated use of multiple Internet application services through a single, unified exchange experience. The process 100 does not use up storage space on user devices, and can reduce user time while increasing service efficiency. Input and output of all Internet application services are based on unified card model data. Internet application service providers can be seamlessly integrated together. The services can be compatible with traditional Internet application services.

Figure 2:
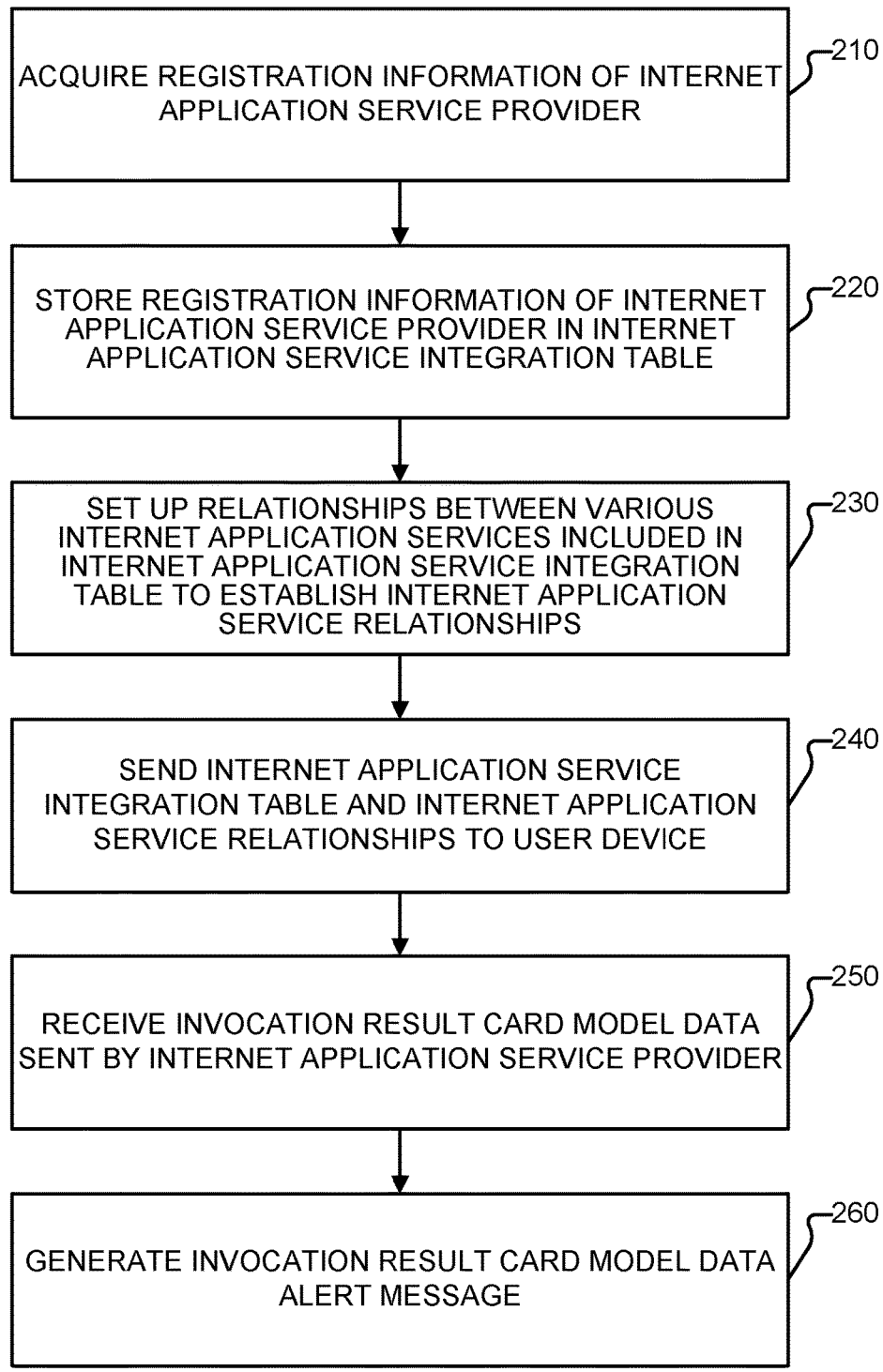
FIG. 2 is a flowchart of another embodiment of a process for providing Internet application services.

FIG. 2 is a flowchart of another embodiment of a process for providing Internet application services. In some embodiments, the process 200 is implemented by a card server 3100 of FIG. 3 and comprises:

In 210, the card server acquires registration information of an Internet application service provider from a storage location specified by the Internet application service provider.

In some embodiments, the registration information includes an identification number for the Internet application service provider, a service type of the Internet application service provided by the Internet application service provider, an entry address of the Internet application service provided by the Internet application service provider, a certificate key of the Internet application service provider, and the like.

In 220, the card server, based on a service type of the Internet application service provided by the Internet application service provider, stores the registration information of the Internet application service provider in an Internet application service integration table (and the corresponding Internet application service type stored therein).

In some embodiments, the Internet application service integration table includes multiple types of Internet application services, and each type of Internet application service includes at least one Internet application service.

In 230, the card server, based on the service types of the Internet application services included in the Internet application service integration table, sets up relationships between the various Internet application services included in the Internet application service integration table to establish Internet application service relationships.

In some embodiments, the Internet application service relationships are stored as relationships between the various Internet application services in a tabulated form. In some embodiments, the Internet application service relationships are to be set up based on actual use conditions, without restriction as to specific format.

In 240, the card server sends the Internet application service integration table and the Internet application service relationships to the user device, enables the user device to acquire the Internet application service selected by the user for invocation from the Internet application service integration table, acquires other Internet application services related to the Internet application service selected for invocation based on the Internet application service relationships, and displays the other Internet application services to the user.

In some embodiments, the process 200 further includes:

In 250, the card server receives invocation result card model data sent by the Internet application service provider and stores the invocation result card model data. In some embodiments, the invocation result card model data is generated by the Internet application service provider based on Internet application service invocation results.

In 260, the card server generates an invocation result card model data alert message and sends the invocation result card model data alert message to the user device to prompt the user device on whether to download the invocation result card model data.

For example, the card data integration table is set up, and the invocation result card model data sent by the Internet application service provider is stored in the card data integration table.

The above process 200 for providing Internet application services is as follows: Multiple inter-related Internet application services are automatically strung together by using a card as a vehicle therefor. A user can make integrated use of multiple Internet application services through a single, unified exchange experience without having to open multiple application programs. The above usage of multiple Internet application services through a single, unified exchange does not use up storage space on user devices and can reduce user time while increasing service efficiency. Input and output of all Internet application services are based on unified card model data. Multiple Internet application service providers can be seamlessly integrated together. The Internet application services can be compatible with traditional Internet application services.

Figure 3:
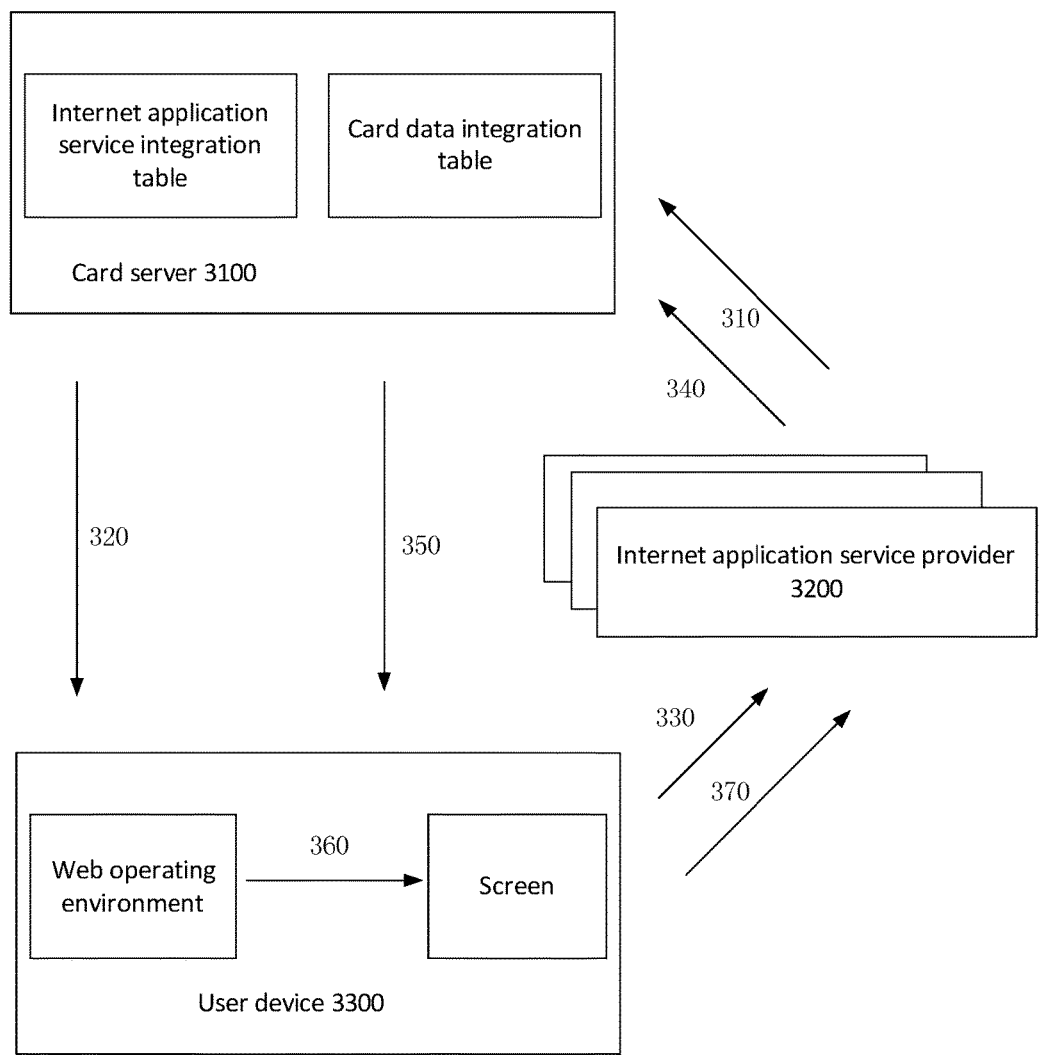
FIG. 3 is a diagram of an embodiment of an application process flow for providing Internet application services.

FIG. 3 is a diagram of an embodiment of an application process flow for providing Internet application services. In some embodiments, the application process flow is performed by a card server 3100, an Internet application service provider 3200, and a user device 3300.

Figure 4:
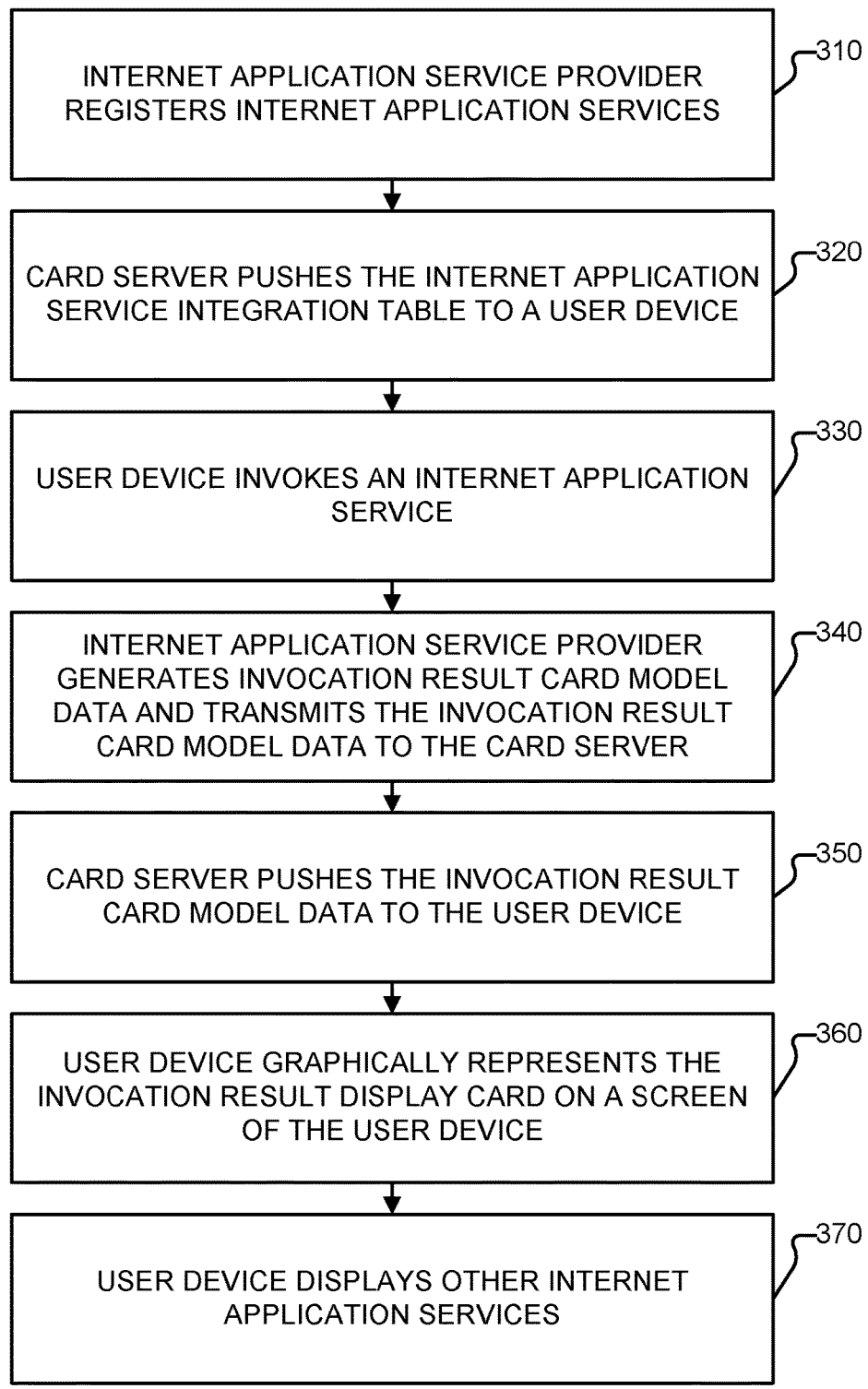
FIG. 4 is a flowchart of yet another embodiment of a process for providing Internet application services.

FIG. 4 is a flowchart of yet another embodiment of a process for providing Internet application services. In this example, the process 300 is explained in connection with FIG. 3 and comprises:

In 310, the Internet application service provider 3200 registers Internet application services.

For example, the Internet application service provider 3200 is to register Internet application services that can be provided on the card server. In some embodiments, registration information of the Internet application service provider includes: an identification number for the Internet application service provider (for uniquely identifying the Internet application service provider), a service type of the Internet application service provided by the Internet application service provider (e.g., airline ticket and travel, discount coupons, movie tickets, food and drink, and shipping and express delivery), an entry address of the Internet application service provided by the Internet application service provider (e.g., the entry address for express delivery service inquiries: http://m.kuaidi100.com/uc/index.html), a certificate key of the Internet application service provider (for Internet application service provider identity verification), and the like.

In 320, the card server 3100 pushes the Internet application service integration table to the user device 3300.

For example, the Internet application service integration table is established and generated in advance by the card server 3100. After the card server 3100 acquires the registration information of the Internet application service provider 3200, the card server 3100, based on the service type of the Internet application service provided by the Internet application service provider 3200, stores the registration information of the Internet application service provider in the corresponding Internet application service type in the Internet application service integration table. In some embodiments, the Internet application service integration table includes multiple types of Internet application services, and each type of Internet application service includes at least one Internet application service. In addition, the card server sets up relationships between the various Internet application services included in the Internet application service integration table based on the service types of the Internet application services included in the Internet application service integration table to obtain Internet application service relationships.

The relationships between the various Internet application services are typically set up using service types. The Internet application services of each type are to include Internet application services of related types. Internet application service relationships such as Airline Ticket->Weather, Airline Ticket->Traffic, and Movie Ticket->Food and Drink indicate that an Internet application service of an airline ticket type is related to Internet application services of weather and traffic, an Internet application service of a movie ticket type is related to an Internet application service of food and drink, etc.

In an example, after the card server generates the Internet application service integration table, the card server pushes the Internet application service integration table to the user device. Moreover, in the event that the Internet application service integration table subsequently changes (e.g., in the event that a new Internet application service provider is registered or an Internet application service provided by an Internet application service provider changes), the change information is pushed to the user device to update the Internet application service integration table on the user device. The card server can also simultaneously push the Internet application service relationships and the Internet application service integration table to the user device for subsequent service-related operations. In some embodiments, information being pushed is in extensible markup language (XML) or a proprietary format. An example of a proprietary format includes JavaScript Object Notation (JSON).

In 330, the user device invokes an Internet application service.

Figure 5:
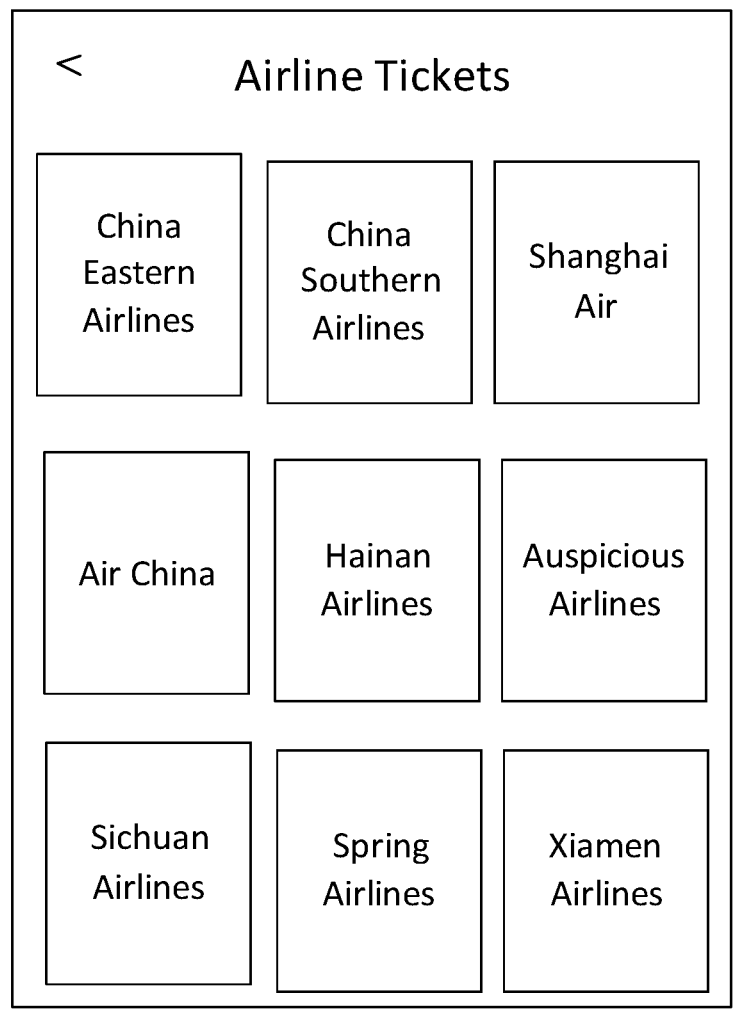
FIG. 5 is a diagram of an example of an airline ticket-type Internet application service.

For example, when the user selects an Internet application service type from the Internet application service integration table of the user device, the user device lists available Internet application services included in an Internet application service type based on the Internet application service integration table. FIG. 5 is a diagram of an example of an airline ticket-type Internet application service. For example, the user selects Airline Tickets. The airline ticket type includes China Eastern Airlines, China Southern Airlines, Shanghai Air, Air China, and other available Internet application services. As soon as the user taps a certain Internet application service, a registered entry address of the Internet application service provider is opened in the Web operating environment embedded in the user device, and a corresponding service page is displayed. The user can perform a corresponding Internet application service invocation operation based on the actual application need. For example, the user could perform the operation of purchasing an airline ticket on the Air China services page. Internet application service invocation results are generated based on an Internet application service invocation operation performed by the user on the service page. For example, ticket information is generated based on the purchasing of the airline ticket on the Air China services page.

Referring back to FIGS. 3 and 4, in 340, the Internet application service provider generates invocation result card model data and transmits the invocation result card model data to the card server.

For example, the Internet application service provider generates invocation result card model data based on the Internet application service invocation results. In some embodiments, a card data model is set up in advance to facilitate identification of relevant data by each Internet application service provider. Based on the Internet application service invocation results, the Internet application service provider generates invocation result card model data based on the card data model. An example of the card data model is as shown in Table 1. For example, the user invokes an airline ticket purchasing service. The airline ticket Internet application service provider can use JSON (JavaScript Object Notation), HTML (Hypertext Markup Language), or other such formats to structure the invocation result card model data based on the Table 1 pattern and send the structured invocation result card model data to the card server. FIG. 6 is a diagram of an example of result card model data. The example of FIG. 6 shows invocation result card model data structured in a JSON format and based on the Table 1 pattern.

Referring back to FIGS. 3 and 4, in 350, the card server pushes the invocation result card model data to the user device.

For example, after the card server receives the invocation result card model data, the card server saves the invocation result card model data in the card data integration table and generates an invocation result card model data alert message. Based on a push channel (e.g., a specific port configured to send HTML5 messages over HTTP) of the user device, the card server pushes the invocation result card model data alert message to the user device. When the user opens the invocation result card model data alert message (e.g., by selecting the message), the corresponding invocation result card model data is downloaded from the card server.

In 360, the user device, in a Web operating environment, graphically represents (e.g., renders) the invocation result display card on a screen of the user device.

For example, the user device, such as an iPhone or a mobile phone running the Android, has a built-in Web operating environment which supports HTML5 parsing and operation. The user device integrates the invocation result card model data with an invocation result card template corresponding to the Internet application service invocation results to generate invocation result card model HTML5 code. The invocation result card model HTML5 code is used in the Web operating environment to graphically represent an invocation result display card on the screen of the user device.

Figure 7:
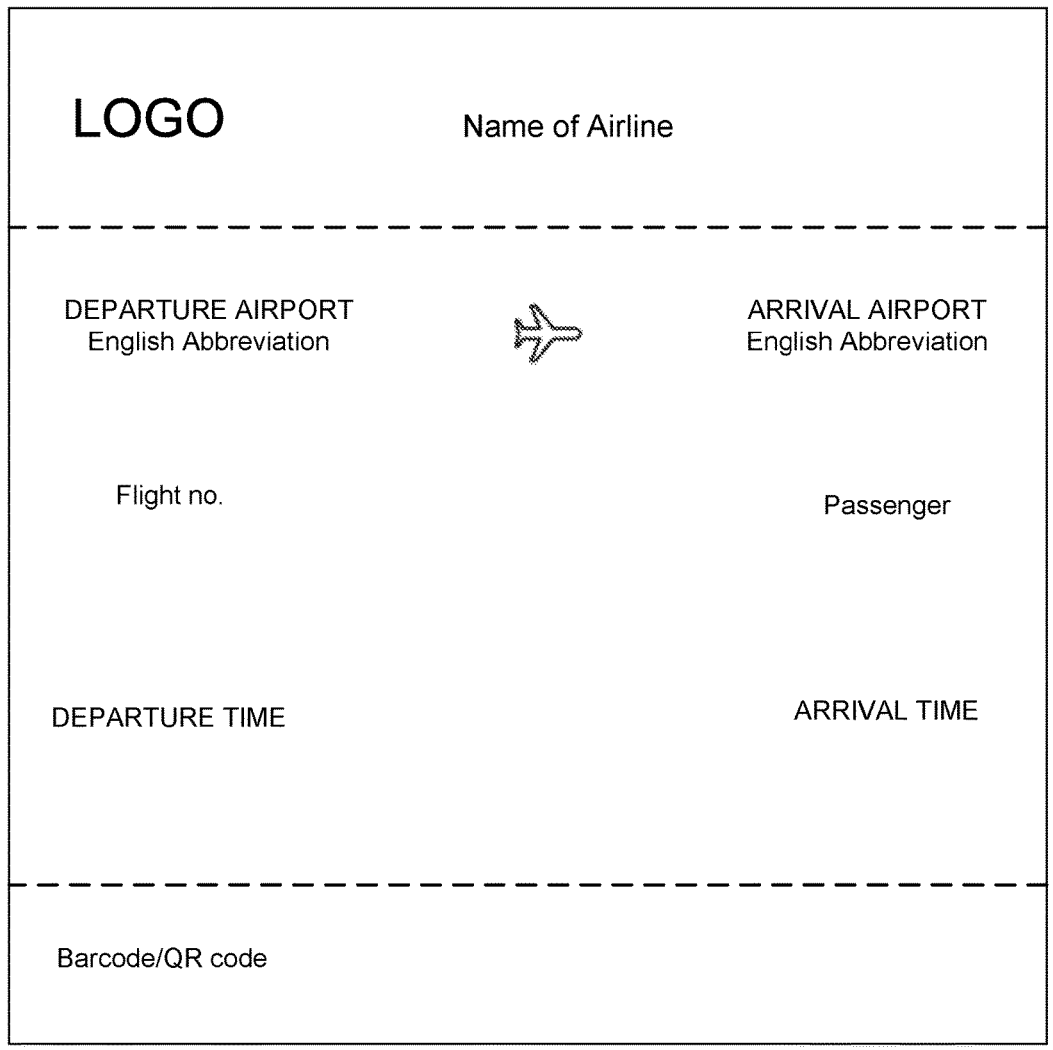
FIG. 7 is a diagram of an example of a result card template.
Figure 8:
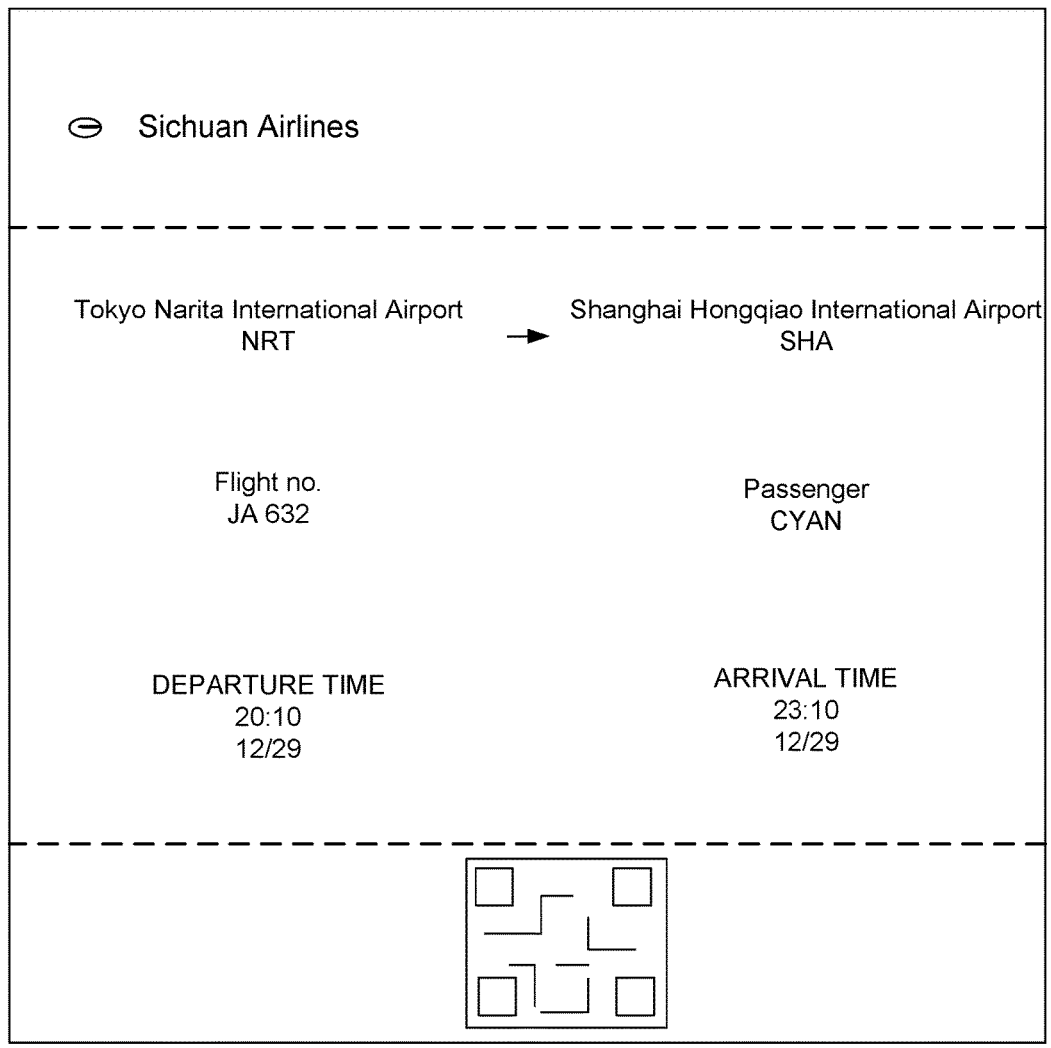
FIG. 8 is a diagram of an example of a result display card.

FIG. 7 is a diagram of an example of a result card template. In this example, airline ticketing related services utilize an invocation result card template corresponding to airline ticket purchasing results. At the top of the result card template, the result card template includes a name of an airline and the airline's corresponding logo, and at the bottom of the result card template, a barcode/QR code is added to bring up the website of the airline upon being scanned. The body of the template includes departure airport, arrival airport, flight no., passenger, departure time, and arrival time. FIG. 8 is a diagram of an example of a result display card. The invocation result card model data is integrated with the invocation result card template to obtain HTML5 code and is graphically represented on the user device screen, as the result display card shown in FIG. 8.

Referring back to FIGS. 3 and 4, in 370, the user device displays other Internet application services.

For example, the user device, based on the Internet application service relationships downloaded synchronously with the pushing of the Internet application service integration table to the user device (operation 320), acquires other Internet application services related to the current Internet application service, and displays the other Internet application services to the user. When the user taps on an Internet application service among the other Internet application services, an entry address corresponding to the Internet application service is invoked, and the invocation result card model data is transmitted as parameters to the Internet application service provider that provides the Internet application service. The Internet application service provider that provides the Internet application service can then perform additional services based on the result card model data. FIG. 11 is a diagram of an example of additional services associated with an invocation result card. In this example, the user may select related services based on the invocation result card model data for movie tickets. Based on existing service type mapping relationships, the related services include FastTaxi (a taxi service application), Taodiandian (a food delivery application), and Mailesong (an online fast food ordering application). The Internet application service provider can obtain invocation result card model data based on the movie ticket card. For example, the movie theater's location and/or distance to the theater can be obtained for the movie ticket card to provide more detailed service. After the movie ticket service is completed, a new invocation result card data (e.g., FIG. 8) is generated as in operation 340, and the process flow continues. Additional services are displayed as in operation 370.

Figure 9A:
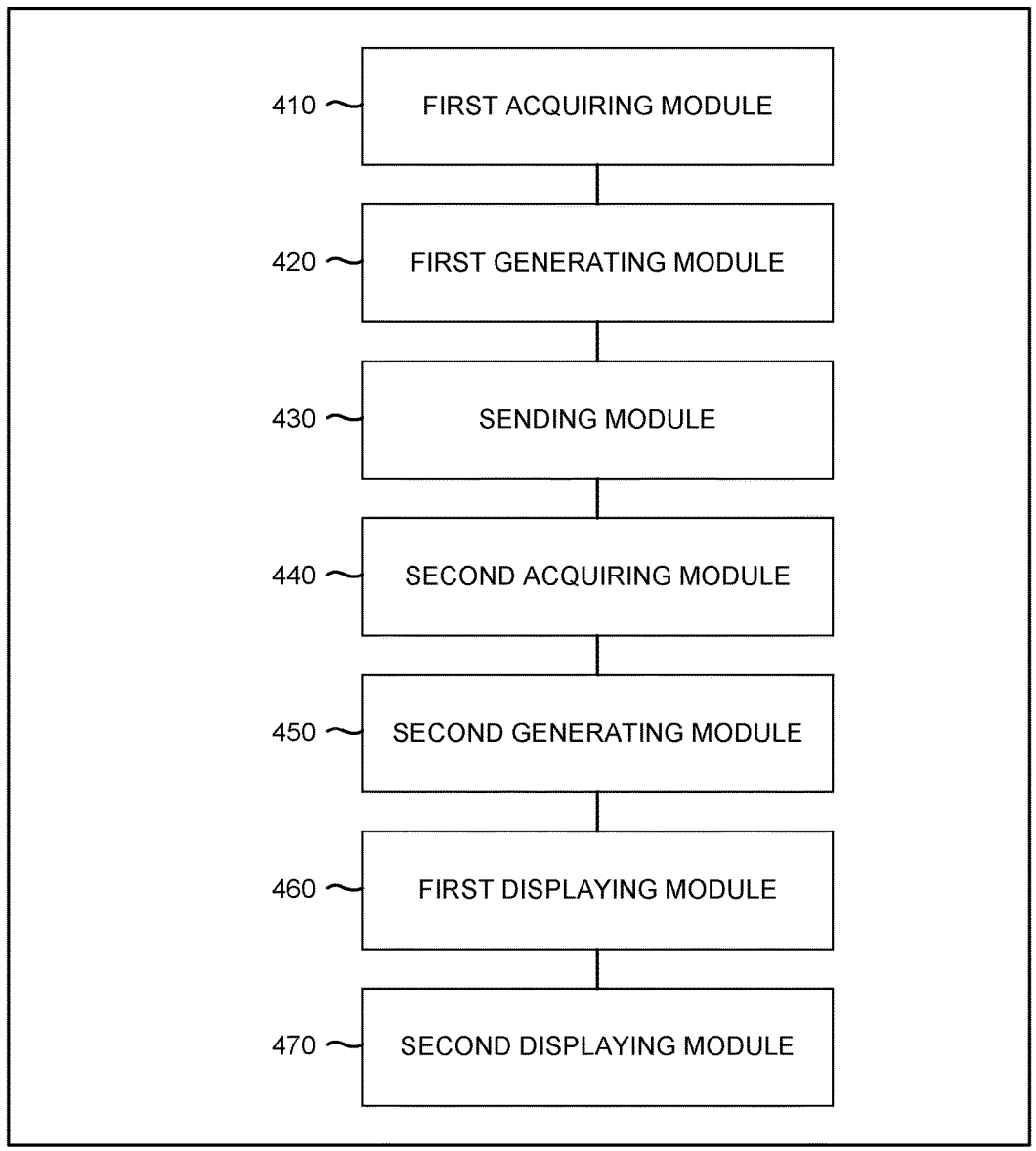
FIG. 9A is a diagram of an embodiment of a user device for providing Internet application services.

FIG. 9A is a diagram of an embodiment of a user device for providing Internet application services. In some embodiments, the user device 400 implements the process 100 of FIG. 1A and comprises: a first acquiring module 410, a first generating module 420, a sending module 430, a second acquiring module 440, a second generating module 450, a first displaying module 460, and a second displaying module 470.

In some embodiments, the first acquiring module 410 acquires an invocation command for an Internet application service and opens a service page corresponding to the Internet application service.

In some embodiments, the first generating module 420 generates Internet application service invocation results based on an Internet application service invocation operation performed by a user on the service page.

In some embodiments, the sending module 430 sends the Internet application service invocation results to the Internet application service provider that provides the Internet application service and generates invocation result card model data based on the Internet application service invocation results.

In some embodiments, the second acquiring module 440 acquires the invocation result card model data.

In some embodiments, the second generating module 450 generates an invocation result display card based on the invocation result card model data and an invocation result card template corresponding to the Internet application service invocation results.

In some embodiments, the first displaying module 460 displays the invocation result display card to the user.

In some embodiments, the second displaying module 470 automatically and simultaneously with the displaying of the invocation result display card looks up other Internet application services related to the Internet application service and displays the other Internet application services to the user.

Figure 9B:
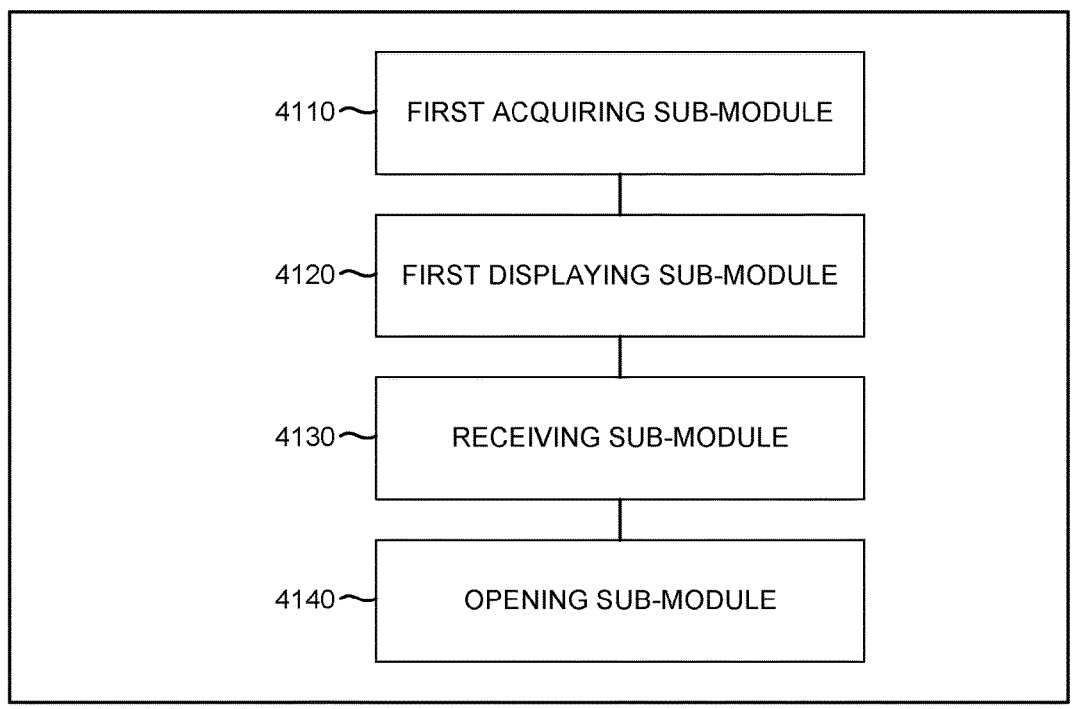
FIG. 9B is a diagram of an embodiment of a first acquiring module.

FIG. 9B is a diagram of an embodiment of a first acquiring module 4100 that is an implementation of the first acquiring module 410 of FIG. 9A and comprises: a first acquiring sub-module 4110, a first displaying sub-module 4120, a receiving sub-module 4130, and an opening sub-module 4140.

In some embodiments, the first acquiring sub-module 4110 acquires an Internet application service type selected by the user from an Internet application service integration table. In some embodiments, the Internet application service integration table includes multiple types of Internet application services, and each type of Internet application service includes at least one Internet application service.

In some embodiments, the first displaying sub-module 4120 displays the Internet application services included in the selected Internet application service type to the user.

In some embodiments, the receiving sub-module 4130 receives the command from the user to invoke the Internet application service included in the selected Internet application service type.

In some embodiments, the opening sub-module 4140 opens a service page corresponding to the Internet application service included in the selected Internet application service type based on an entry address corresponding to the Internet application service included in the selected Internet application service type.

Figure 9C:
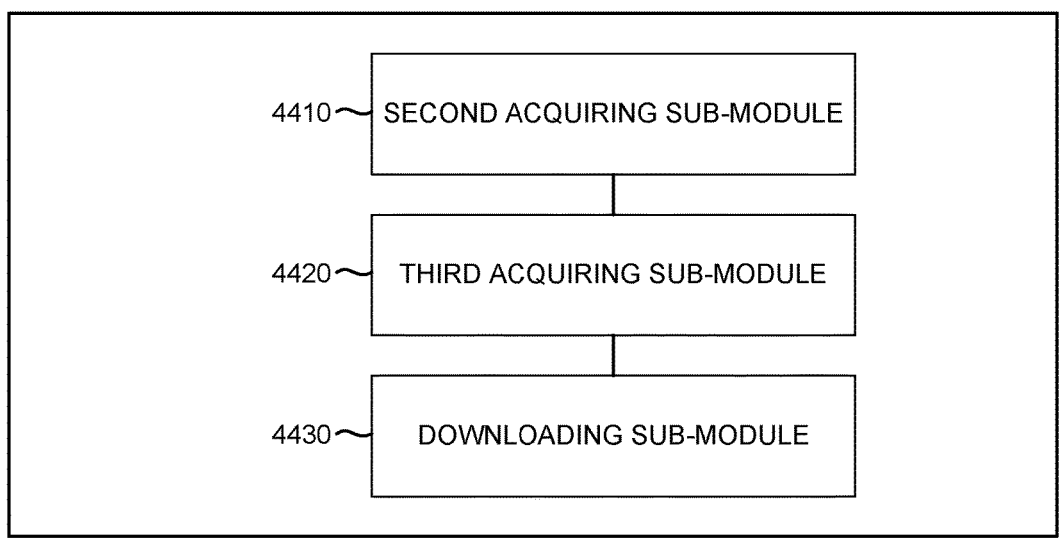
FIG. 9C is a diagram of an embodiment of a second acquiring module.

FIG. 9C is a diagram of an embodiment of a second acquiring module. In some embodiments, the second acquiring module 4400 is an implementation of the second acquiring module 440 of FIG. 9A and comprises: a second acquiring sub-module 4410, a third acquiring sub-module 4420, and a downloading sub-module 4430.

In some embodiments, the second acquiring sub-module 4410 acquires an invocation result card model data alert message sent by a card server. In some embodiments, the invocation result card model data alert message is generated by the card server after the card server receives the invocation result card model data sent from the Internet application service provider, and the invocation result card model data is stored at the card server after the card server receives the invocation result card model data sent from the Internet application service provider.

In some embodiments, the third acquiring sub-module 4420 acquires the command when the user opens the invocation result card model data alert message.

In some embodiments, the downloading sub-module 4430 downloads the invocation result card model data from the card server.

Figure 9D:
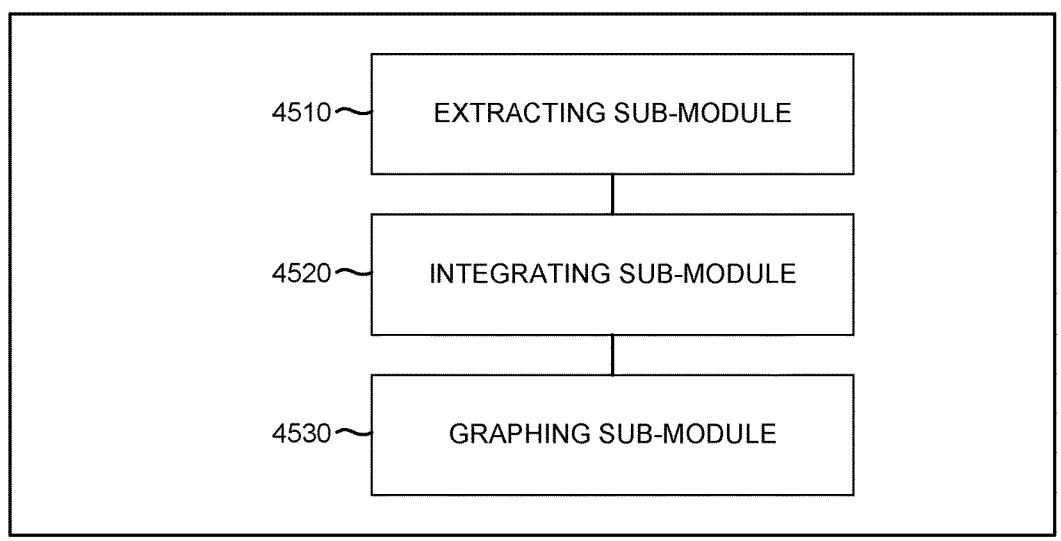
FIG. 9D is a diagram of an embodiment of a second generating module.

FIG. 9D is a diagram of an embodiment of a second generating module. In some embodiments, the second generating module 4500 is an implementation of the second generating module 450 of FIG. 9A and comprises: an extracting sub-module 4510, an integrating sub-module 4520, and a graphing sub-module 4530.

In some embodiments, the extracting sub-module 4510 extracts an invocation result card template corresponding to the Internet application service invocation results.

In some embodiments, the integrating sub-module 4520 integrates the invocation result card template with the invocation result card model data to compose invocation result card model HyperText Markup Language HTML5 code.

In some embodiments, the graphing sub-module 4530 graphically represents the invocation result display card based on the invocation result card model HTML5 code.

Furthermore, in some embodiments, the second displaying module 470 of FIG. 9A looks up preset Internet application service relationships to establish other Internet application services related to the Internet application service.

The user device 400 of FIG. 9A corresponds to the above process 100 of FIG. 1A.

The user device 400 performs the following: Multiple inter-related Internet application services are automatically strung together by using a card as a vehicle therefor. Without having to open multiple application programs a user can make integrated use of multiple Internet application services through a single, unified exchange experience. The exchange experience does not use up storage space on user devices, and the exchange experience can save user time while increasing service efficiency. Input and output of all Internet application services are based on unified card model data. Internet application service providers can be seamlessly integrated together. The Internet application services can be compatible with traditional Internet application services.

Figure 10:
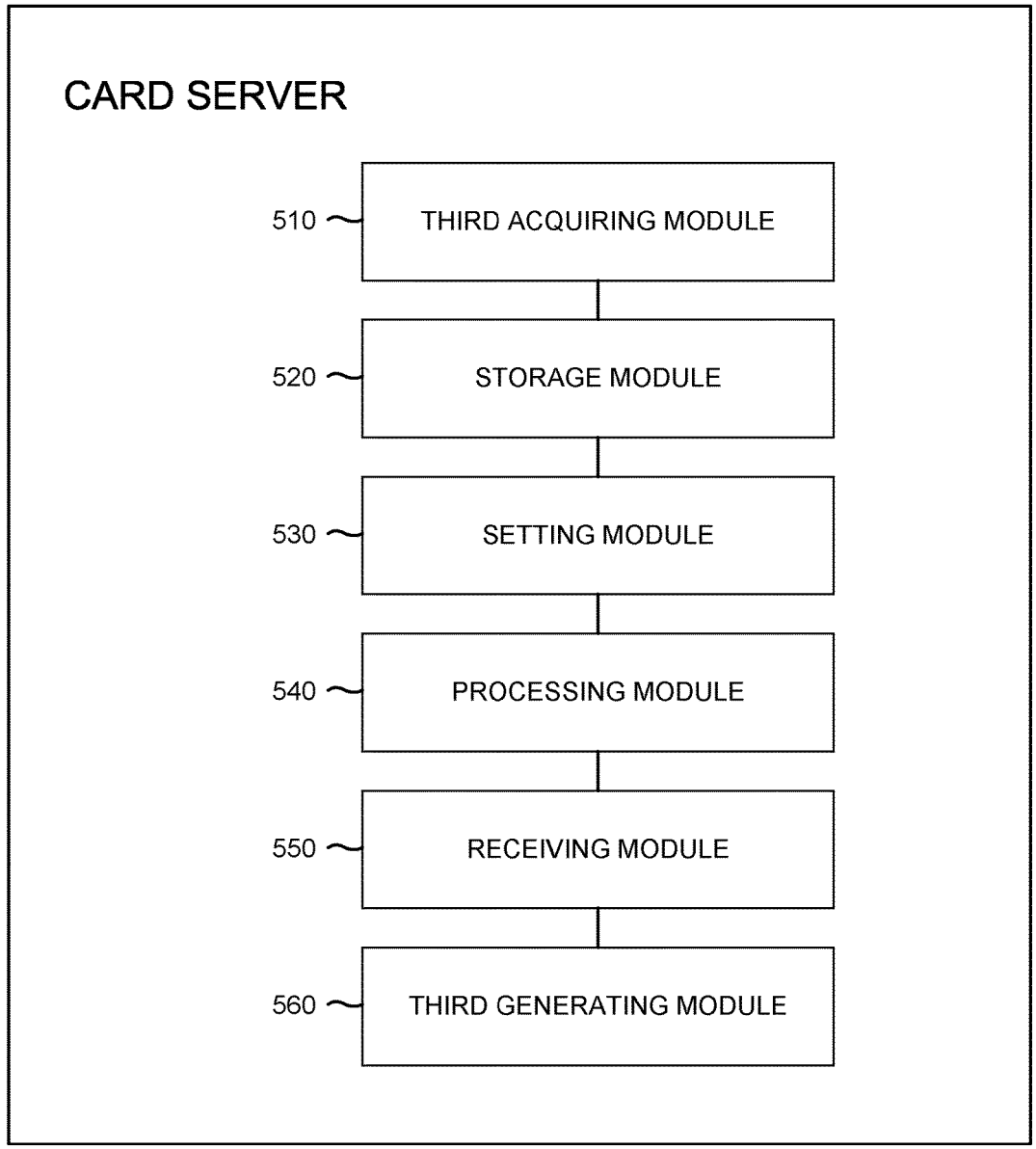
FIG. 10 is a diagram of an embodiment of a card server for providing Internet application services.

FIG. 10 is a diagram of an embodiment of a card server for providing Internet application services. In some embodiments, the card server 500 implements the process 200 of FIG. 2 and comprises: a third acquiring module 510, a storage module 520, a setting module 530, and a processing module 540.

In some embodiments, the third acquiring module 510 acquires registration information of an Internet application service provider. In some embodiments, the registration information includes an identification number for the Internet application service provider, a service type of the Internet application service provided by the Internet application service provider, an entry address of the Internet application service provided by the Internet application service provider, a certificate key of the Internet application service provider, and the like.

In some embodiments, the storage module 520 stores the registration information of the Internet application service provider in the corresponding Internet application service type in the Internet application service integration table based on the service type of the Internet application service provided by the Internet application service provider. In some embodiments, the Internet application service integration table includes multiple types of Internet application services, and each type of Internet application service includes at least one Internet application service.

In some embodiments, the setting module 530 sets up relationships between the various Internet application services included in the Internet application service integration table based on the service types of the Internet application services included in the Internet application service integration table to establish Internet application service relationships.

In some embodiments, the processing module 540 sends the Internet application service integration table and the Internet application service relationships to the user device, enables the user device to acquire the Internet application service selected by the user for invocation from the Internet application service integration table, acquires other Internet application services related to the Internet application service selected for invocation based on the Internet application service relationships, and displays the other Internet application services to the user.

In some embodiments, the card server 500 further comprises a receiving module 550 and a third generating module 560.

In some embodiments, the receiving module 550 receives invocation result card model data sent by the Internet application service provider and stores the invocation result card model data. In some embodiments, the invocation result card model data is generated by the Internet application service provider based on the Internet application service invocation results.

In some embodiments, the third generating module 560 generates an invocation result card model data alert message and sends the invocation result card model data alert message to the user device to prompt the user device on whether to download the invocation result card model data.

The above card server 500 corresponds to the above process 200 of FIG. 2.

The above card server 500 performs the following: Multiple inter-related Internet application services are automatically strung together using a card as a vehicle therefor. A user can make integrated use of multiple Internet application services through a single, unified exchange experience without having to open multiple application programs. The exchange experience does not use up storage space on user devices, and the exchange experience can save user time while increasing service efficiency. Input and output of all Internet application services are based on unified card model data. Internet application service providers can be seamlessly integrated together. The services can be compatible with traditional Internet application services.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    acquiring, using a processor, an Internet application service invocation command for an Internet application service and opening a service page corresponding to the Internet application service, comprising:
        acquiring an Internet application service type selected among a plurality of Internet application service types, the Internet application service type comprising at least one Internet application service, wherein information pertaining to the plurality of Internet application service types is provided by a card server, the card server being used to complete at least a portion of logic for an invocation result display card, and wherein the Internet application service type relates to a first Internet application service type; and
        opening the service page corresponding to the Internet application service included in the selected Internet application service type based on an entry address corresponding to the Internet application service included in the selected Internet application service type;
    generating, using the processor, an Internet application service invocation result based on an Internet application service invocation operation performed by a user on the service page;
    sending the Internet application service invocation result to an Internet application service provider that provides the Internet application service;
    causing the Internet application service provider to:
        generate invocation result card model data based on the Internet application service invocation result; and
        send back the invocation result card model data;
    acquiring the invocation result card model data;
    generating, using the processor, the invocation result display card based on the invocation result card model data and an invocation result card template, the invocation result card template corresponding to the Internet application service invocation result, wherein the generating of the invocation result display card comprises:
        integrating the invocation result card template with the invocation result card model data to obtain an invocation result card model code; and
        graphically representing the invocation result display card based on the invocation result card model code;
    displaying the invocation result display card to the user;
    automatically looking up other Internet application services related to the Internet application service, wherein at least one of the other Internet application services relates to a second Internet application service type, the second Internet application service type having a relationship with the first Internet application service type, the second Internet application service type being different from the first Internet application service type; and
    displaying the other Internet application services to the user.

2. The method as described in claim 1, wherein the acquiring of the Internet application service invocation command for the Internet application service and the opening of the service page corresponding to the Internet application service comprises:
    displaying one or more Internet application services included in the selected Internet application service type to the user; and
    receiving the Internet application service invocation command from the user to invoke the Internet application service included in the selected Internet application service type.

3. The method as described in claim 1, wherein the acquiring of the invocation result card model data comprises:

acquiring an invocation result card model data alert message sent by the card server, wherein the invocation result card model data alert message is generated after the invocation result card model data is sent to the card server, and after the invocation result card model data is received and stored by the card server;

acquiring the Internet application service invocation command when the user opens the invocation result card model data alert message; and downloading the invocation result card model data from the card server.

4. The method as described in claim 1, wherein the automatically looking up of the other Internet application service related to the Internet application service comprises:
automatically looking up preset Internet application service relationships to obtain the other Internet application services related to the Internet application service.

5. The method as described in claim 1, wherein the invocation result card model code corresponds to invocation result card model HTML5 code.

6. The method as described in claim 1, wherein the first Internet application service type and the second Internet application service type both relate to airline ticket, travel, discount coupons, movie tickets, food, drink, weather, traffic, shipping, express delivery, or any combination thereof.

7. A user device, comprising:
a processor; and
a memory coupled with the processor, wherein the memory is configured to provide the processor with instructions which when executed cause the processor to:
acquire an Internet application service invocation command for an Internet application service and open a service page corresponding to the Internet application service, comprising to:
acquire an Internet application service type selected among a plurality of Internet application service types, the Internet application service type comprising at least one Internet application service, wherein information pertaining to the plurality of Internet application service types is provided by a card server, the card server being used to complete at least a portion of logic for an invocation result display card, and wherein the Internet application service type relates to a first Internet application service type; and
open the service page corresponding to the Internet application service included in the selected Internet application service type based on an entry address corresponding to the Internet application service included in the selected Internet application service type;
generate an Internet application service invocation result based on an Internet application service invocation operation performed by a user on the service page;
send the Internet application service invocation result to an Internet application service provider that provides the Internet application service;
cause the Internet application service provider to:
generate invocation result card model data based on the Internet application service invocation; result and send back the invocation result card model data
acquire the invocation result card model data;
generate the invocation result card display card based on the invocation result card model data and an invocation result card template, the invocation result card template corresponding to the Internet application service invocation result, wherein the generating of the invocation result display card comprises to:
integrate the invocation result card template with the invocation result card model data to obtain an invocation result card model code; and
graphically represent the invocation result display card based on the invocation result card model code;
display the invocation result display card to the user; and
automatically look up other Internet application services related to the Internet application service, wherein at least one of the other Internet application services relates to a second Internet application service type, the second Internet application service type having a relationship with the first Internet application service type, the second Internet application service type being different from the first Internet application service type; and
display the other Internet application services to the user.

8. The user device as described in claim 7, wherein the acquiring of the Internet application service invocation command for the Internet application service and the opening of the service page corresponding to the Internet application service further comprises to:
display one or more Internet application services included in the selected Internet application service type to the user; and
receive the Internet application service invocation command from the user to invoke the Internet the Internet application service included in the selected Internet application service type.

9. The user device as described in claim 7, wherein the acquiring of the invocation result card model data comprises:
acquire an invocation result card model data alert message sent by the card server, wherein the invocation result card model data alert message is generated after the invocation result card model data is sent to the card server, and after the invocation result card model data is received and stored by the card server;
acquire the Internet application service invocation command when the user opens the invocation result card model data alert message; and
download the invocation result card model data from the card server.

10. The user device as described in claim 7, wherein the automatically looking up of the other Internet application service related to the Internet application service comprises:
looking up preset Internet application service relationships to obtain other Internet application services related to the Internet application service.

11. The user device as described in claim 7, wherein the invocation result card model code corresponds to invocation result card model HTML5 code.

12. A computer program product being embodied in a tangible non-transitory computer readable storage medium and comprising computer instructions for:
acquiring an Internet application service invocation command for an Internet application service and opening a service page corresponding to the Internet application service, comprising:
acquiring an Internet application service type selected among a plurality of Internet application service types, the Internet application service type comprising at least one Internet application service, wherein information pertaining to the plurality of Internet application service types is provided by a card server, the card server being used to complete at least a portion of logic for an invocation result display card, and wherein the Internet application service type relates to a first Internet application service type; and opening the service page corresponding to the Internet application service included in the selected Internet application service type based on an entry address corresponding to the Internet application service included in the selected Internet application service type;

generating an Internet application service invocation result based on an Internet application service invocation operation performed by a user on the service page;

sending the Internet application service invocation result to an Internet application service provider that provides the Internet application service;

causing the Internet application service provider to:
   generate invocation result card model data based on the Internet application service invocation result; and
   send back the invocation result card model data;

acquiring the invocation result card model data;

generating the invocation result display card based on the invocation result card model data and an invocation result card template, the invocation result card template corresponding to the Internet application service invocation result, wherein the generating of the invocation result display card comprises:
   integrating the invocation result card template with the invocation result card model data to obtain an invocation result card model code; and
   graphically representing the invocation result display card based on the invocation result card model code;

displaying the invocation result display card to the user;

automatically looking up other Internet application services related to the Internet application service, wherein at least one of the other Internet application services relates to a second Internet application service type, the second Internet application service type having a relationship with the first Internet application service type, the second Internet application service type being different from the first Internet application service type; and displaying the other Internet application services to the user.

* * * * *

UNITED STATES PATENT AND TRADEMARK OFFICE
CERTIFICATE OF CORRECTION

PATENT NO. : 10,069,893 B2
APPLICATION NO. : 14/669868
DATED : September 4, 2018
INVENTOR(S) : Yuan et al.

Page 1 of 1

It is certified that error appears in the above-identified patent and that said Letters Patent is hereby corrected as shown below:

In the Claims

In Column 15, Claim 7, Line 61, delete "invocation; result" and insert --invocation result;--, therefor.

Signed and Sealed this
Fifteenth Day of January, 2019

Andrei Iancu
*Director of the United States Patent and Trademark Office*